US012766444B1

(12) United States Patent
Nehlen, III

(10) Patent No.: US 12,766,444 B1
(45) Date of Patent: Oct. 20, 2026

(54) FLUID STRAINER

(71) Applicant: Paul F. Nehlen, III, Delavan, WI (US)

(72) Inventor: Paul F. Nehlen, III, Delavan, WI (US)

(73) Assignee: Blue Skies Global LLC, Williams Bay, WI (US)

( * ) Notice: Subject to any disclaimer, the term of this patent is extended or adjusted under 35 U.S.C. 154(b) by 467 days.

(21) Appl. No.: 18/389,978

(22) Filed: Dec. 20, 2023

Related U.S. Application Data

(60) Provisional application No. 63/435,018, filed on Dec. 23, 2022.

(51) Int. Cl.
*B01D 29/13* (2006.01)
*B01D 35/30* (2006.01)

(52) U.S. Cl.
CPC ............. *B01D 29/13* (2013.01); *B01D 35/30* (2013.01); *B01D 2201/304* (2013.01)

(58) Field of Classification Search
None
See application file for complete search history.

(56) References Cited

U.S. PATENT DOCUMENTS

| | | | | | |
|---|---|---|---|---|---|
| 432,793 | A * | 7/1890 | Crocket | B01D 35/02 | 210/312 |
| 493,378 | A * | 3/1893 | Gibson | B01D 35/153 | 210/136 |
| 622,217 | A * | 4/1899 | Fuller et al. | B01D 35/02 | D23/209 |
| 738,088 | A * | 9/1903 | Vauclain et al. | B01D 35/02 | 285/354 |
| 1,113,365 | A * | 10/1914 | Maloney | B01D 35/02 | 210/489 |
| 1,152,831 | A * | 9/1915 | Monteagle | F16L 55/24 | 210/443 |
| 1,161,715 | A * | 11/1915 | Merrill | B01D 29/03 | 210/411 |
| 1,199,350 | A * | 9/1916 | Collin | B01D 29/05 | 210/414 |
| 1,274,940 | A * | 8/1918 | Sage | B01D 29/23 | 210/452 |
| 1,458,464 | A * | 6/1923 | Byers | B01D 35/02 | 210/497.3 |
| 1,483,892 | A * | 2/1924 | Kinney | B01D 35/12 | 210/341 |

(Continued)

FOREIGN PATENT DOCUMENTS

| | | | |
|---|---|---|---|
| GB | 778524 | | 7/1957 |
| GB | 1119730 | A * | 7/1968 |
| WO | 03/055570 | | 7/2003 |

*Primary Examiner* — Robert J Popovics
(74) *Attorney, Agent, or Firm* — Salter & Michaelson

(57) ABSTRACT

A fluid strainer that is meant to remove debris from the flow of fluid through a strainer and that includes a housing having inlet and outlet ports. The housing defines an interior chamber through which the fluid flows. The fluid strainer including a single strainer basked disposed within the housing chamber. The strainer basket has open input end into which the fluid flows from the housing inlet and opposed side walls that extend in the direction of the fluid. The strainer basked further includes an open output end that is comprised of a pair of tapered output wall that direct the fluid flow to the housing outlet port.

20 Claims, 10 Drawing Sheets

(56) References Cited

U.S. PATENT DOCUMENTS 1,496,771 A * 6/1924 Cash ........ B01D 35/02 210/310
1,534,129 A * 4/1925 Marden ........ B01D 35/02 210/318
1,595,983 A * 8/1926 Armstrong ........ B01D 35/02 210/313
1,616,577 A * 2/1927 Janette ........ B01D 35/005 210/248
1,631,822 A * 6/1927 Jahn ........ B01D 35/02 210/312
1,654,615 A * 1/1928 Smith ........ B01D 27/00 210/443
1,657,173 A * 1/1928 Morrison ........ B01D 35/153 210/135
1,671,487 A * 5/1928 Quiroz ........ B01D 29/682 210/194
1,679,033 A * 7/1928 Holmes ........ B01D 35/02 210/312
1,685,655 A * 9/1928 Wenzka ........ B01D 29/902 210/120
1,903,774 A * 4/1933 Burrell ........ B01D 33/503 210/402
1,908,933 A * 5/1933 Tinello ........ B01D 35/04 210/489
1,958,268 A * 5/1934 Goldman ........ B01D 29/15 210/508
1,961,498 A * 6/1934 Krueger ........ B01D 35/02 210/497.3
1,971,733 A * 8/1934 Shimer ........ F04B 53/1037 210/447
1,977,601 A * 10/1934 Winton ........ F16L 55/24 210/411
2,028,520 A * 1/1936 Phillips ........ B01D 29/117 210/455
2,041,366 A * 5/1936 Moran ........ B01D 35/02 210/411
2,064,510 A 12/1936 Wells
2,275,958 A * 3/1942 Hagel ........ B01D 35/16 210/414
2,305,351 A * 12/1942 Hellan ........ B01D 35/00 210/313
2,327,648 A 8/1943 Kasten
2,359,938 A * 10/1944 Quiroz ........ B01D 35/14 210/453
2,372,445 A * 3/1945 Morgan ........ B01D 35/02 210/453
2,374,976 A 5/1945 Briggs et al.
2,547,277 A 4/1951 Marsh et al.
2,562,699 A 7/1951 Cooperson et al.
2,603,353 A * 7/1952 Cooney ........ B01D 35/06 62/DIG. 13
2,606,663 A * 8/1952 Blackman ........ F16L 55/24 210/451
2,613,454 A * 10/1952 White ........ A47L 9/19 96/417
2,661,096 A * 12/1953 Tinker ........ B01D 35/02 210/313
2,678,732 A * 5/1954 Banks ........ B01D 29/6476 210/414
2,761,529 A * 9/1956 Wisenbaugh ........ B60T 17/002 55/482
2,798,613 A * 7/1957 Tinker ........ B01D 35/02 D23/209
2,801,008 A * 7/1957 Schmid ........ E03C 1/29 210/444
2,915,188 A * 12/1959 Buker ........ F16L 55/24 220/318
2,979,209 A * 4/1961 Nolden ........ B01D 29/23 210/435
3,011,644 A * 12/1961 Mankin ........ B01D 29/23 210/453
3,048,275 A 8/1962 Headrick
3,100,190 A 8/1963 Hobson, Jr.
3,149,072 A 9/1964 Silverman
3,179,253 A * 4/1965 Mcneal ........ B01D 29/96 55/505
3,256,995 A * 6/1966 Schmid ........ B01D 29/682 210/485
3,280,982 A * 10/1966 Barto ........ F16L 55/24 210/446
3,282,430 A * 11/1966 Kinne ........ A01G 25/00 210/162
3,289,847 A 12/1966 Rothemund
3,556,298 A * 1/1971 Werner ........ B01D 35/147 210/493.1
3,633,753 A 1/1972 Petitjean
3,715,033 A 2/1973 Soriente
3,724,669 A * 4/1973 Thal ........ B01D 29/15 210/409
3,779,388 A * 12/1973 Coughlin ........ B01D 35/043 210/392
3,789,990 A * 2/1974 Drori ........ B01D 35/22 210/488
3,823,831 A * 7/1974 LeBlanc, Jr. ........ B01D 35/02 210/429
4,033,875 A 7/1977 Besik
4,051,042 A * 9/1977 Tullier ........ B01D 35/02 4/256.1
4,059,519 A * 11/1977 Zieg ........ B01D 35/02 210/474
4,134,836 A 1/1979 Rowley et al.
4,198,220 A * 4/1980 Keller ........ B01D 45/06 55/DIG. 37
4,301,011 A * 11/1981 Stamm ........ B01D 35/02 210/447
4,353,722 A 10/1982 Berz
4,473,472 A 9/1984 Muller
4,476,021 A * 10/1984 Souza ........ B01D 35/02 210/446
4,478,238 A * 10/1984 Maddox ........ F16T 1/34 138/44
4,517,086 A 5/1985 Romey et al.
4,529,518 A * 7/1985 Jackson ........ B01D 29/33 210/512.1
4,568,463 A 2/1986 Klein
4,582,605 A * 4/1986 Rea ........ B01D 29/35 210/450
4,604,201 A 8/1986 Muller
4,609,459 A * 9/1986 Hendrix ........ B01D 35/02 210/91
4,609,462 A 9/1986 Flynn
4,657,673 A 4/1987 Kessler
4,931,175 A 6/1990 Krofta
5,087,272 A 2/1992 Nixdorf
5,128,038 A 7/1992 Slavitschek et al.
5,132,013 A * 7/1992 Thompson ........ B01D 29/35 210/497.3
5,194,160 A * 3/1993 Simonelli ........ B01D 29/6476 210/791
5,277,829 A 1/1994 Ward
5,397,465 A 3/1995 Stewart
5,435,911 A 7/1995 Hohle
5,575,832 A 11/1996 Boyd
RE35,560 E * 7/1997 Simonelli ........ B01D 29/606 210/791
5,667,679 A 9/1997 Bozenmayer et al.
5,766,458 A 6/1998 Sekhar et al.
5,855,799 A 1/1999 Hermann
5,863,443 A * 1/1999 Mainwaring ........ B01D 21/0006 210/441
5,897,787 A * 4/1999 Keller ........ B01D 29/96 210/477
5,944,991 A * 8/1999 Shellenbarger ........ F16L 55/24 210/489
5,963,709 A 10/1999 Staples et al.
6,007,718 A 12/1999 Booth
6,149,703 A * 11/2000 Parker ........ B01D 35/30 55/502

(56) References Cited

U.S. PATENT DOCUMENTS 6,162,354 A * 12/2000 Yang .................... B01D 35/153 55/424
6,309,552 B1 10/2001 Hobson, Jr.
6,342,158 B1 1/2002 Wills
6,461,506 B1 * 10/2002 Bradford ................ B01D 29/94 210/488
6,478,954 B1 * 11/2002 Turner, Jr. ................ E03F 5/12 210/170.03
6,497,815 B1 * 12/2002 Koller .................. B01D 29/014 210/415
6,537,449 B2 3/2003 Schewitz
6,616,842 B1 9/2003 Soria et al.
6,860,394 B1 3/2005 Mueller et al.
6,866,153 B2 * 3/2005 Turner, Jr. ............. B01D 29/27 210/162
6,994,738 B2 * 2/2006 Taddey .............. B01D 46/2403 55/306
7,282,142 B2 * 10/2007 Kraft ...................... B01D 29/66 210/170.03
7,381,336 B2 6/2008 Stedman
RE40,481 E * 9/2008 Borla ................. B01D 46/2403 55/497
7,651,619 B2 * 1/2010 Hansen ................ B01D 33/466 210/384
7,666,318 B1 2/2010 Lehtinen et al.
7,875,178 B2 * 1/2011 Ashliman ............ B01D 24/007 210/477
7,882,960 B2 * 2/2011 Hansen .................. B01D 35/12 210/396
7,901,585 B1 3/2011 Lehtinen et al.
8,038,879 B2 * 10/2011 Kraft .................... B01D 36/001 210/322
8,118,173 B2 * 2/2012 Taylor ..................... B07B 13/18 209/264
8,252,172 B2 8/2012 Hall
8,303,688 B2 11/2012 Sharma
8,366,923 B1 * 2/2013 Happel ..................... E03F 5/14 210/170.03
8,465,571 B2 6/2013 Billiet
8,534,467 B2 * 9/2013 Haas ......................... E03B 7/07 285/354
8,858,795 B2 * 10/2014 McLane ............... B01D 29/908 210/313
8,944,787 B2 * 2/2015 Korupp ................... F04D 13/06 417/423.9
9,126,130 B2 * 9/2015 Killian ................... B23K 35/32
9,127,896 B1 9/2015 Nehlen, III
9,149,742 B1 10/2015 Nehlen, III
9,187,890 B2 * 11/2015 Semba ................. B01D 29/445
9,302,205 B1 4/2016 Nehlen, III
9,303,924 B1 4/2016 Nehlen, III
9,375,664 B2 * 6/2016 Perz ..................... B01D 29/014
9,387,421 B1 7/2016 Nehlen, III
9,494,372 B2 11/2016 Nehlen, III
9,561,454 B2 * 2/2017 Browning ............ B01D 29/035
9,581,395 B2 2/2017 Nehlen, III
9,630,130 B2 4/2017 Nehlen, III
10,406,458 B1 9/2019 Nehlen, III
10,688,419 B2 * 6/2020 Browning ............ B01D 29/688
10,722,825 B2 * 7/2020 Loshe ........................ B03B 5/04
10,786,761 B2 * 9/2020 Ismert .................... B01D 35/30
10,794,794 B2 * 10/2020 Bowdle ................. G01M 9/065
10,814,255 B1 10/2020 Nehlen, III
10,814,256 B1 10/2020 Nehlen, III
10,850,216 B1 12/2020 Nehlen, III
10,981,091 B1 4/2021 Nehlen, III
11,065,566 B2 7/2021 Nehlen, III
11,167,226 B2 11/2021 Nehlen, III
11,224,830 B2 * 1/2022 Wildermuth ........... B01D 29/96
11,273,393 B2 * 3/2022 Mir ........................ B01D 29/01
11,673,079 B2 6/2023 Nehlen, III
11,969,675 B2 * 4/2024 Okuno ................. B01D 29/902
12,121,833 B2 * 10/2024 Yan ........................ B01D 29/31
12,180,817 B2 * 12/2024 Trueheart ............... B01D 29/15
12,330,093 B2 * 6/2025 Nehlen, III ............ B01D 29/90
12,330,094 B2 * 6/2025 Nehlen, III ............ B01D 29/17
12,427,455 B2 * 9/2025 Hamkens ............... B01D 35/02
12,528,034 B2 * 1/2026 Nehlen, III ............ B01D 29/52
2003/0196950 A1 * 10/2003 Kraft .................... B01D 36/001 210/322
2004/0144105 A1 * 7/2004 Ballet .................. B01D 29/117 62/85
2006/0051273 A1 3/2006 Son
2006/0272319 A1 12/2006 Dettling et al.
2008/0029453 A1 2/2008 Mertens et al.
2008/0099392 A1 * 5/2008 Kraft ...................... B01D 29/52 210/346
2009/0283463 A1 * 11/2009 Kim ....................... B01D 35/02 210/162
2009/0297766 A1 12/2009 Furuta
2010/0116732 A1 * 5/2010 Jung ...................... B01D 35/02 210/447
2010/0133152 A1 * 6/2010 Taylor ................... B07B 1/4681 209/675
2010/0155336 A1 * 6/2010 Simonson ............... B03C 1/286 210/695
2011/0000862 A1 * 1/2011 Semba ...................... E03F 5/14 210/304
2011/0114195 A1 * 5/2011 Haas ........................ F16L 55/24 137/15.01
2011/0132817 A1 * 6/2011 Gardner ................. B01D 29/23 210/411
2012/0241369 A1 * 9/2012 McLane ............... B01D 29/906 210/301
2014/0001744 A1 * 1/2014 Haas ...................... B01D 35/02 285/5
2020/0238200 A1 * 7/2020 Ismert .................... B01D 29/35
2020/0289970 A1 * 9/2020 Holzmann ......... B01D 46/0002
2021/0113951 A1 * 4/2021 Oh ......................... B01D 46/71
2022/0184535 A1 * 6/2022 Okuno ................... B01D 35/02
2023/0108937 A1 * 4/2023 Perez ..................... B01D 35/02 210/167.1
2023/0249105 A1 * 8/2023 Yan ........................ B01D 29/31 210/314
2024/0060408 A1 * 2/2024 Trueheart ............... B01D 29/15
2024/0226786 A1 * 7/2024 Hamkens ............... B01D 35/02
2024/0382879 A1 * 11/2024 Hajri ...................... B01D 29/68
2024/0399275 A1 * 12/2024 Okuno ................... B01D 29/11
2025/0375723 A1 * 12/2025 Nehlen, III ............ B01D 36/02
2026/0048346 A1 * 2/2026 Nehlen, III ............ B01D 24/10

* cited by examiner

FLUID STRAINER

RELATED CASES

Priority for this application is hereby claimed under 35 U.S.C. § 119 (e) to commonly owned and U.S. Provisional Patent Application No. 63/435,018 which was filed on Dec. 23, 2022 and which is incorporated by reference herein in its entirety.

TECHNICAL FIELD

The present invention relates in general to a fluid strainer which is typically used for removing and straining suspended substances from a fluid flow. More particularly, the present invention relates to a fluid strainer that more effectively controls the flow and minimizes turbulence within the strainer device; and thus within the entire filter system.

BACKGROUND OF THE INVENTION

Existing strainer devices are considered as having certain drawbacks. For one thing, they are generally assembled using several bolts; typically in excess of 20 bolts. Each time that the strainer is to be serviced, this requires the unfastening and refastening of the strainer housing cover. This is a time-consuming step in order to service the strainer. As a result, many times the strainer chamber does not get emptied often enough. This can lead to system failures including excessive back pressure. Another problem associated with existing strainers is that they do not provide an effective flow path through the strainer and thus are subject to unwarranted turbulence.

Accordingly, it is an object of the present invention to provide an improved strainer construction that eliminates the need for multiple fasteners to secure the cover of the strainer housing.

Another object of the present invention is to provide an improved strainer that enhances the flow of fluid through the strainer thus minimizing turbulence.

Still another object of the present invention is to provide an improved strainer that relies upon pneumatic pressure for sealing a lid or cover to the strainer housing.

SUMMARY OF THE INVENTION

In accordance with the present invention there is provided a fluid strainer that is meant to remove debris from a fluid stream. The fluid strainer is comprised of a housing having an inlet port and an outlet port that is in a position that is generally opposite to the inlet port. The housing defines an interior chamber through which the fluid flows. The fluid strainer of the present invention includes preferably a single strainer basket that is disposed within the housing chamber. The strainer basket has an open input end into which the fluid flows from the housing inlet, and opposed sidewalls that extend generally in a flow direction of the fluid. The strainer basked further includes an open output end that is comprised of a pair of tapered outlet walls that direct the fluid flow to the housing outlet port. This flow is substantially unimpeded and provides a smooth transition of the fluid to the housing outlet port.

In accordance with other aspects of the [resent invention the basket further includes an end wall; the end wall has a series of through holes for the passage of fluid flow; the tapered outlet walls also each include a series of holes; the end wall is smaller than the outlet port in the housing; the end wall is the same size as the outlet port in the housing; the end wall is greater than the outlet port in the housing; the tapered outlet walls progress from a wider cross-section to a narrower cross-section; the inlet port is inline with the outlet port; the opposed sidewalls are solid and thus re-direct the fluid flow toward the end wall of the basket; including a lid that is disposed over the housing and covering the interior chamber and a gasket that is disposed between the housing and the lid; further including a pneumatic apparatus coupled to the interior chamber to provide a firm seal at the gasket; further including a mechanical interlock mechanism so that the lid is secured to the housing, and wherein the interlock mechanism is operable followed by the operation of the pneumatic apparatus; the mechanical interlock mechanism includes a tab and slot arrangement; the tab and slot arrangement comprises at least one tab on an underside of the lid and at least one slot in the housing; including a catcher that is meant to intercept certain items; particularly larger size items; and wherein the catcher is of cross-shape and is disposed at the open input end of the strainer basket.

In accordance with the present invention there is also provided a fluid strainer that is meant to remove debris from a fluid stream, comprising: a housing having an inlet port and an outlet port that is opposite to the inlet port; said housing defining an interior chamber through which the fluid flows; a strainer basket that is disposed within the housing chamber and that is meant for the accumulation of debris; a lid that is disposed over the housing and covering the interior chamber; a gasket that is disposed between the housing and the lid; and pneumatic apparatus coupled to the interior chamber to provide a firm seal at the gasket.

In accordance with other aspects of the present invention further including a mechanical interlock mechanism so that the lid is secured to the housing; wherein the interlock mechanism is operable followed by the operation of the pneumatic apparatus; wherein the mechanical interlock mechanism includes a tab and slot arrangement; and wherein the tab and slot arrangement comprises at least one tab on an underside of the lid and at least one slot in the housing.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1A:
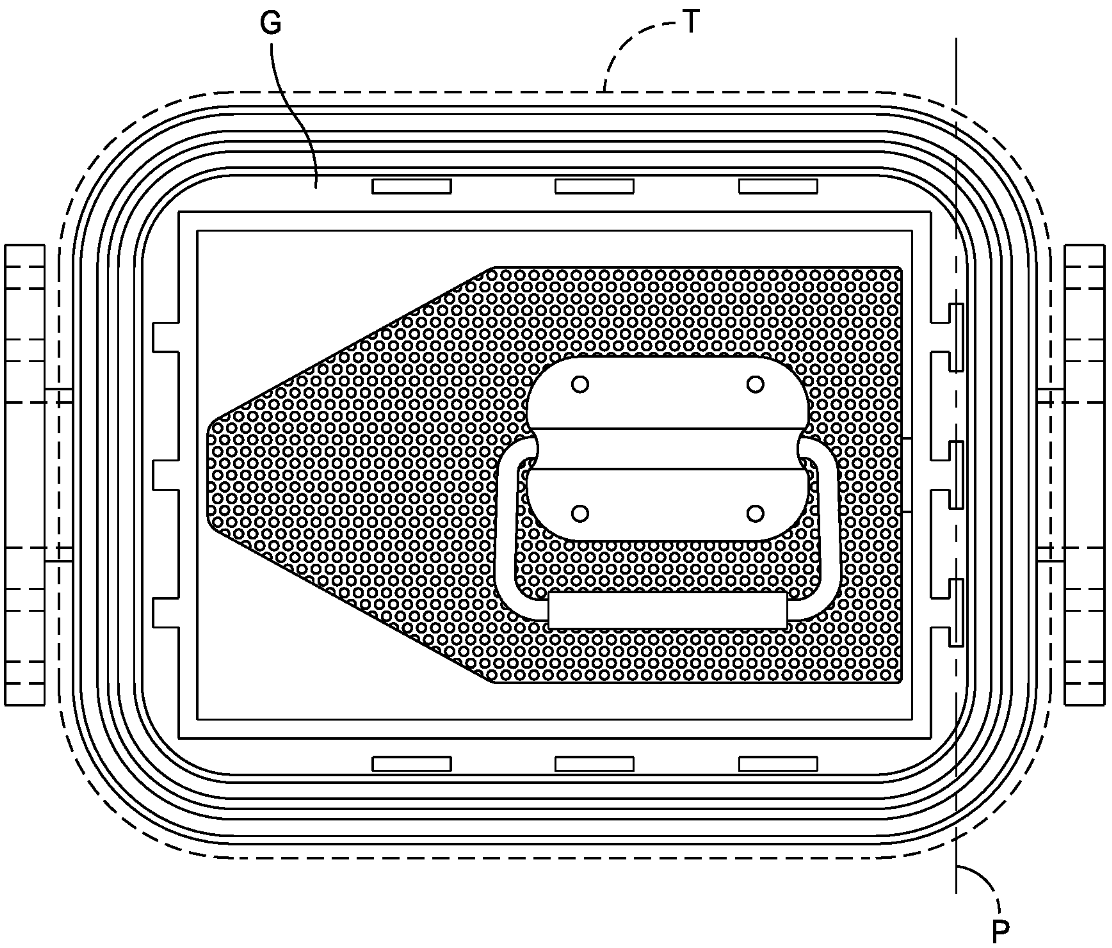
FIG. 1A is a top view of the housing.
Figure 1B:
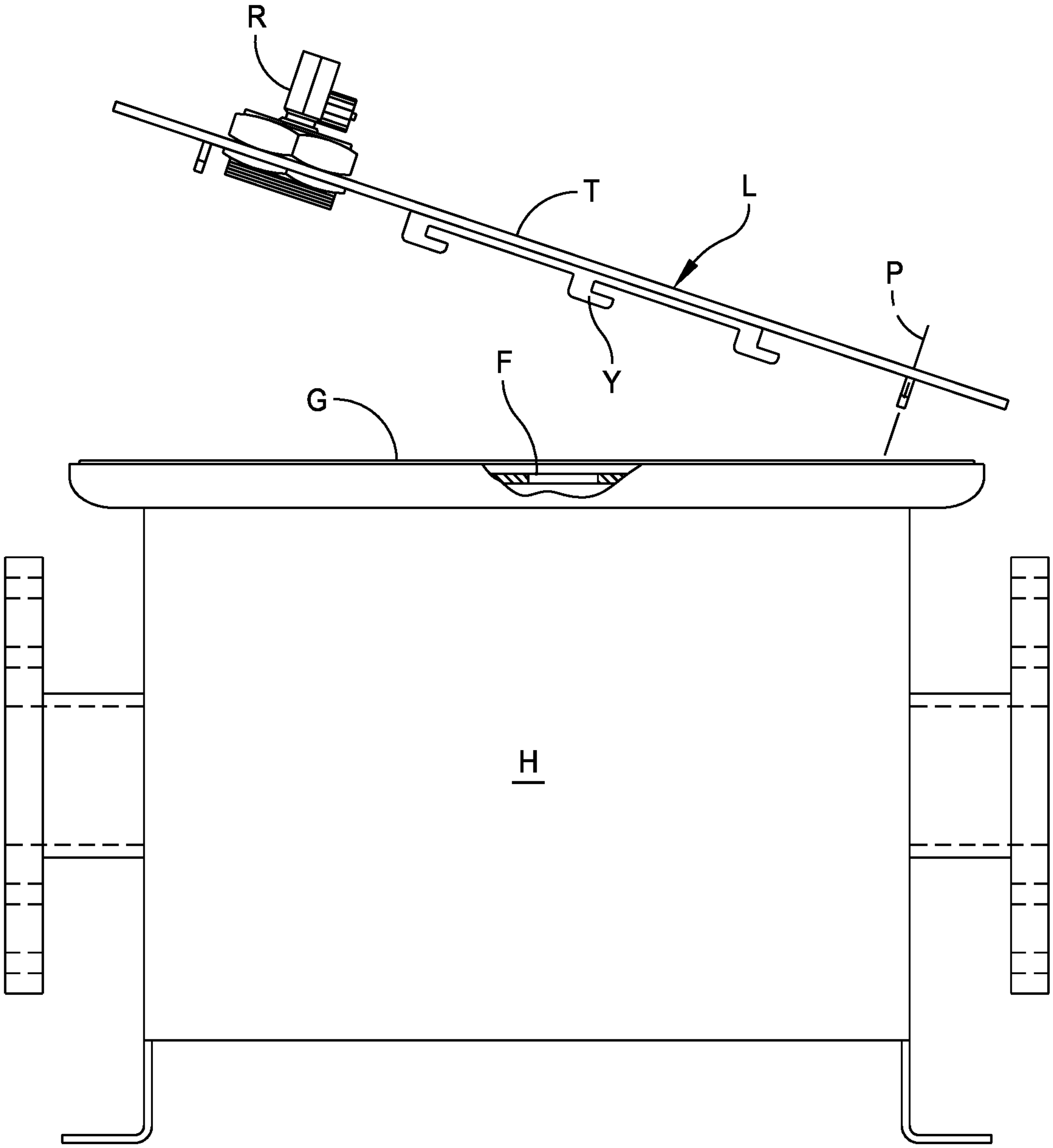
FIG. 1B depicts the concept of the present invention of sealing the strainer housing without requiring several fasteners.

Reference is now made to FIGS. 1A and 1B. As has been indicated, rather than using several securing members to secure the strainer top, the top piece T is meant to slide into a position where it can then be pivoted against the top rim of the chamber and then locked in place. This occurs in a simple one step action without requiring multiple fasteners that have to be unthreaded and rethreaded.

FIG. 1B depicts the concept of the present invention of sealing the strainer housing without requiring several fasteners. FIG. 1A is a top view of FIG. 1B. FIG. 1B shows both the housing H and the lid or cover L. FIG. 1B also illustrates the application of pneumatic force indicated by the input box R. A top piece T that seals the housing is slid into a slot in the cover L. The cover is meant to pivot at point P. FIG. 1B also shows the gasket G. The top piece T is meant to engage against the surface of the gasket G. Refer also to more detailed diagrams in FIGS. 6-9.

Although a pivot arrangement is illustrated in FIG. 1B, in an alternate embodiment of the present invention the cover can be constructed and arranged to be disposed substantially in parallel to the gasket G so that, rather than the pivot mechanism, some type of a slide mechanism is employed to move the cover against and away from the gasket G. In either embodiment it is pneumatic or hydraulic pressure that is employed in moving the cover from an open position to a closed position either by pivoting or a linear transition.

Reference is now made to FIGS. 2-5 to illustrate the construction of the strainer housing; and more particularly, the unique construction of the basket B. In FIGS. 2-5 the housing is shown at H having an inlet port P1 and an outlet port P2. Refer in particular to a more detailed construction in the exploded perspective view of FIG. 5.

The housing H defines an interior chamber through which the fluid flows through the basket B. The strainer basket has an open input end clearly depicted in FIG. 5. In this regard also refer in FIG. 5 to the use of a catcher CA that is meant to intercept certain items; particularly larger size items. The catcher CA is of cross-shape and is disposed at the open input end of the strainer basket; adjacent to the inlet port P1.

Figure 2:
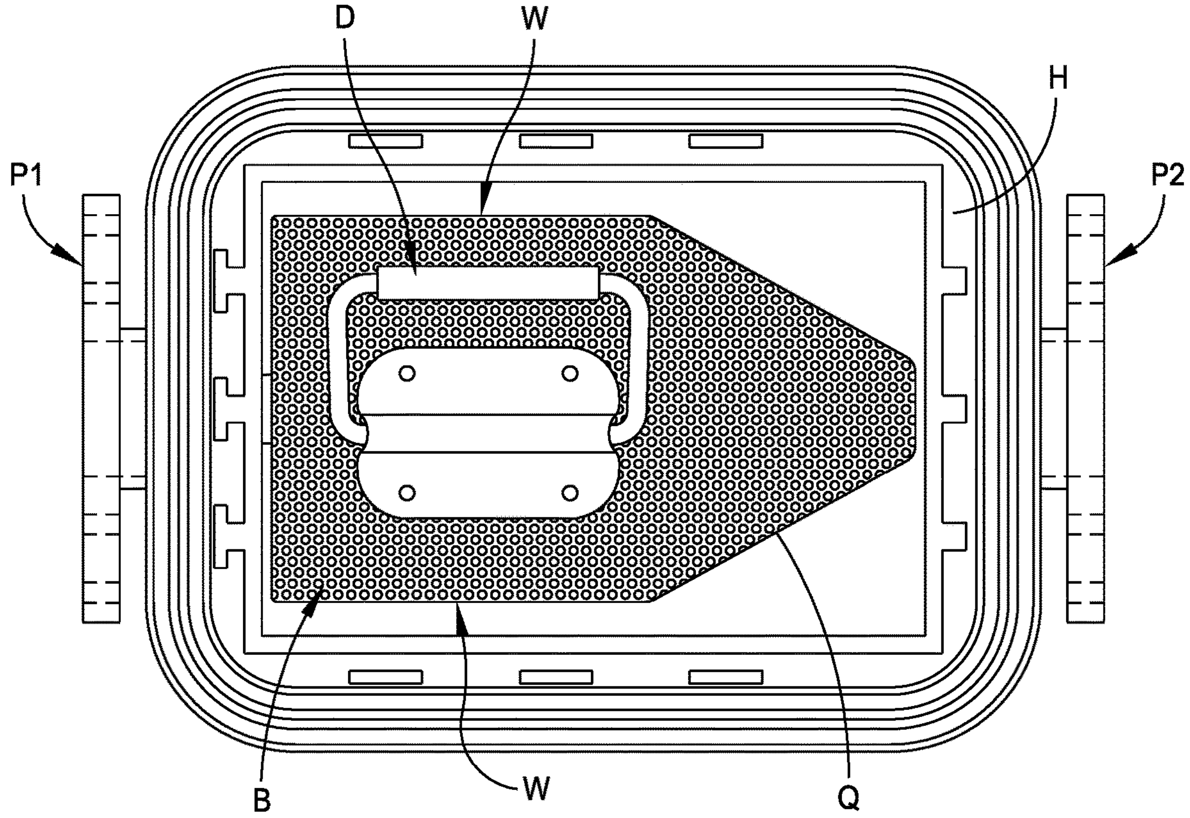
FIG. 2 is a plan view illustrating the strainer basket.
Figure 5:
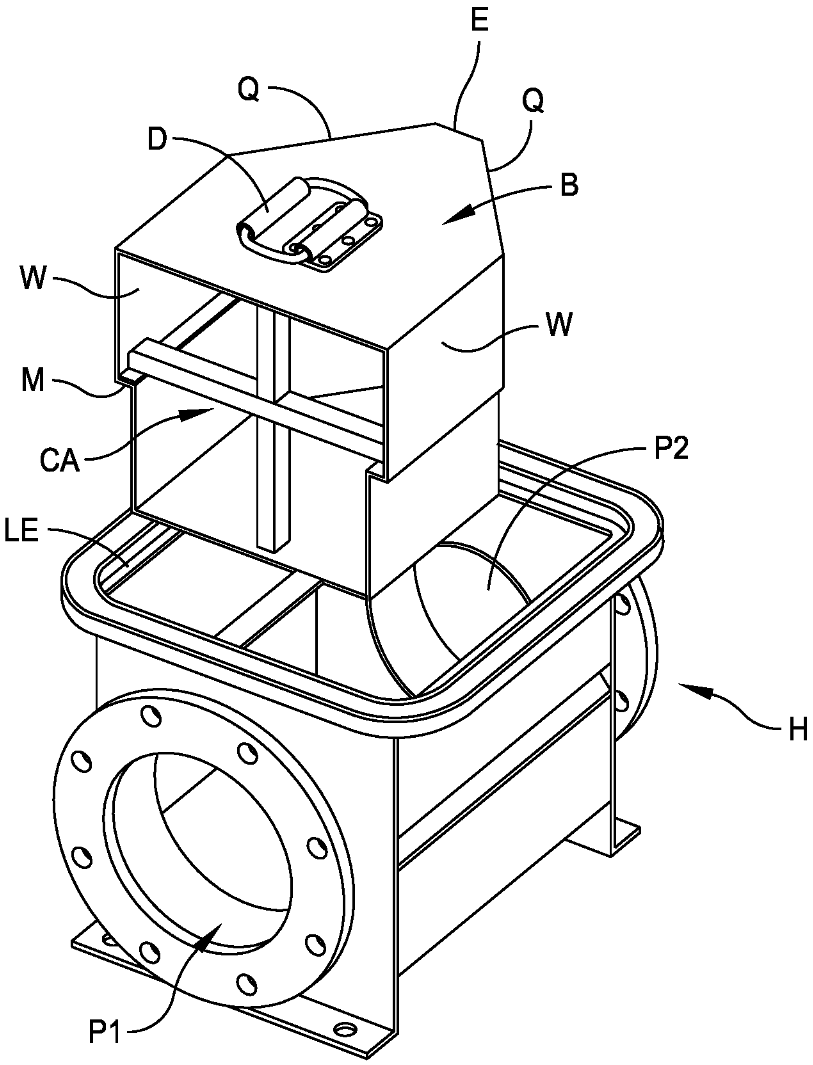
FIG. 5 is an exploded perspective view of the strainer of the present invention, and including the strainer housing and basket.

The strainer basket also includes opposed sidewalls W that extend generally in the same flow direction of the fluid. It is noted that the sidewalls W are provided with an indentation at M at opposed sides thereof. This indentation is meant to sit upon the ledge LE in the strainer housing as shown in FIG. 5. The strainer basket B further includes an output end depicted in the drawings as an end wall E that is disposed adjacent to the outlet port P2. In FIG. 2 the end wall E is illustrated as spaced from the port P2. However, the end wall E can also be disposed substantially directly at the port P2. Th basket B is also provided with a handle D as illustrate in FIGS. 2 and 5.

Figure 3:
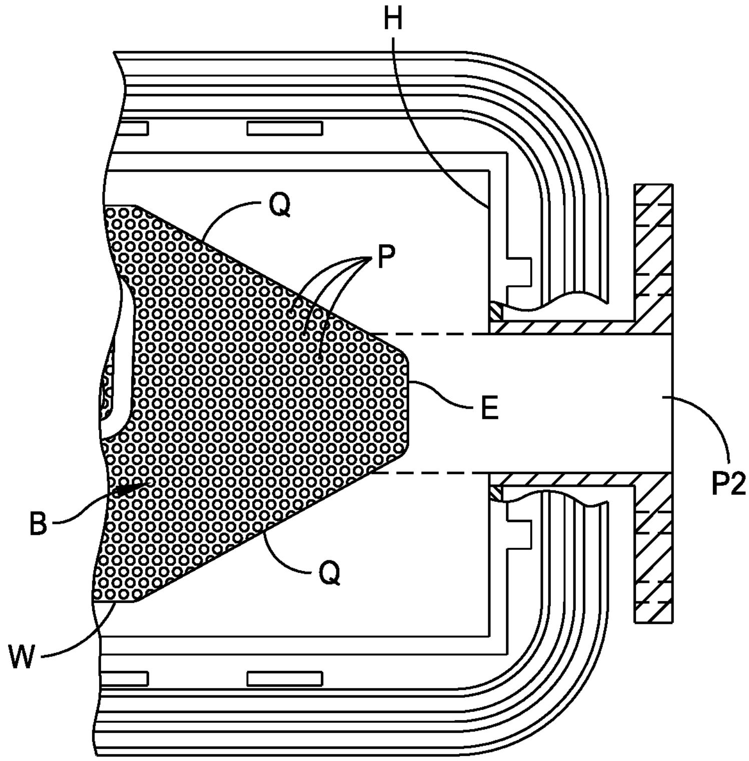
FIG. 3 illustrates an alternate embodiment of the tapered sidewalls of the basket.
Figure 4:
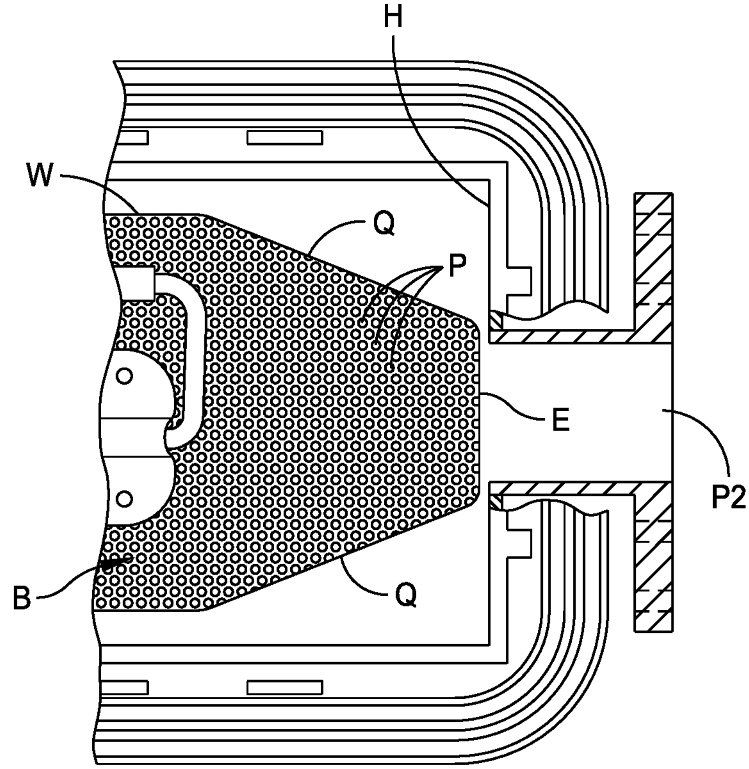
FIG. 4 illustrates a second alternate embodiment of the tapered sidewalls.

In FIG. 2 the end wall E is smaller than the diameter of the outlet port P2. Reference may now be made to FIGS. 3 and 4 that illustrate different relative dimensions regarding the end wall E and the outlet port P2. FIG. 3 illustrates the end wall E as being substantially the same as the diameter of the port P2. FIG. 4 illustrates the end wall E as being slightly greater than the diameter of the port P2. The sidewalls Q may be solid in construction but are preferably provided with perforations P such as illustrated in FIGS. 3 and 4. The end wall E is provided with perforations that enable the flow to continue to the outlet port P2. The walls Q taper toward the outlet port.

In accordance with one embodiment of the present invention there is provided the combination of using pneumatics; along with a mechanical interlock between the housing and lid. Thus, the strainer includes a mechanical interlock mechanism so that the lid is secured to the housing. The interlock mechanism is operable followed by the operation of the pneumatic apparatus. The mechanical interlock mechanism includes a tab and slot arrangement; wherein the tab and slot arrangement comprises at least one tab on an underside of the lid and at least one slot in the housing. Alternatively, the tab may be provided at the housing end and the slot at the lid end.

Figure 6:
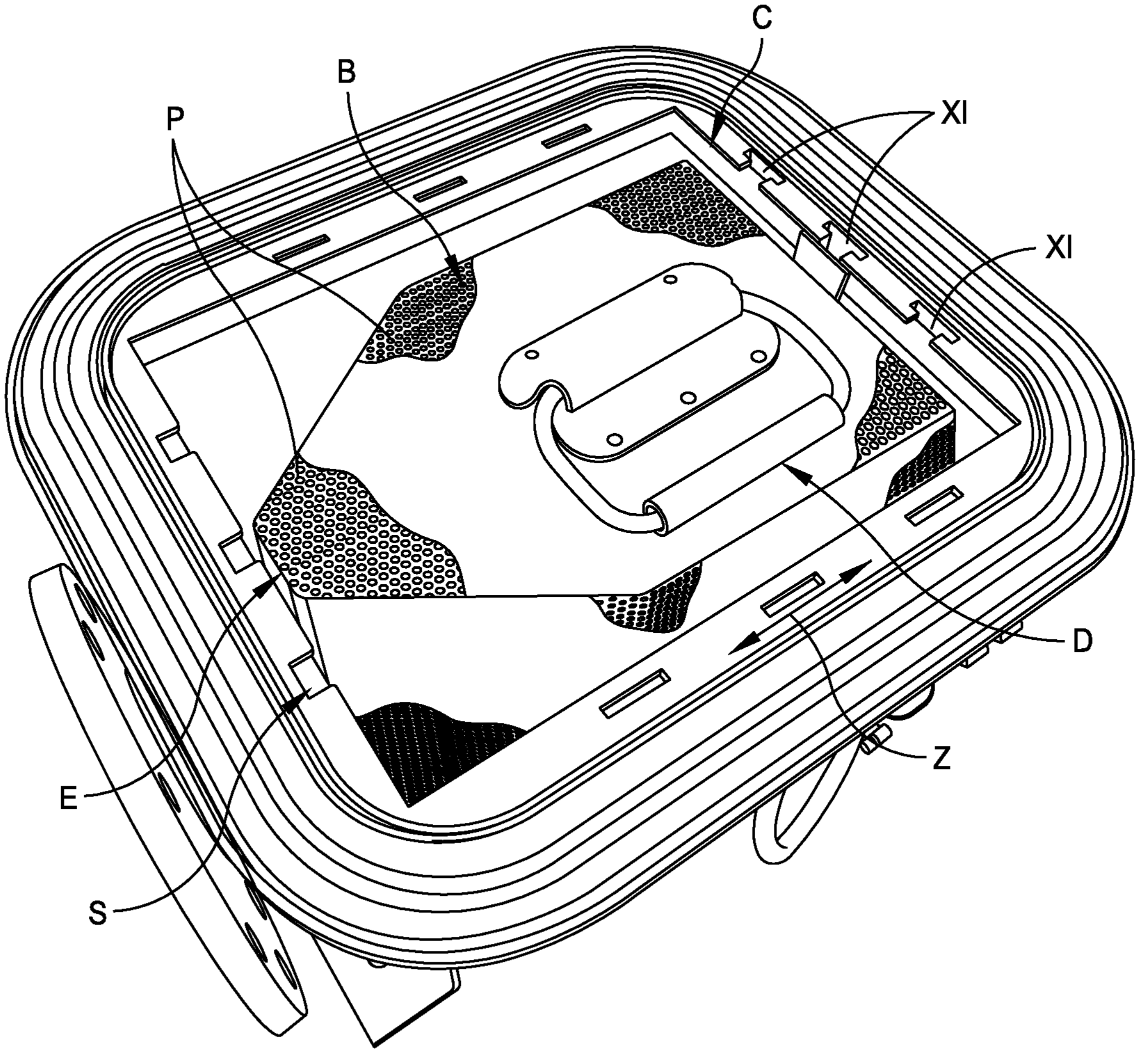
FIG. 6 is a top perspective view of the top of the strainer housing with the basket in place.
Figure 7:
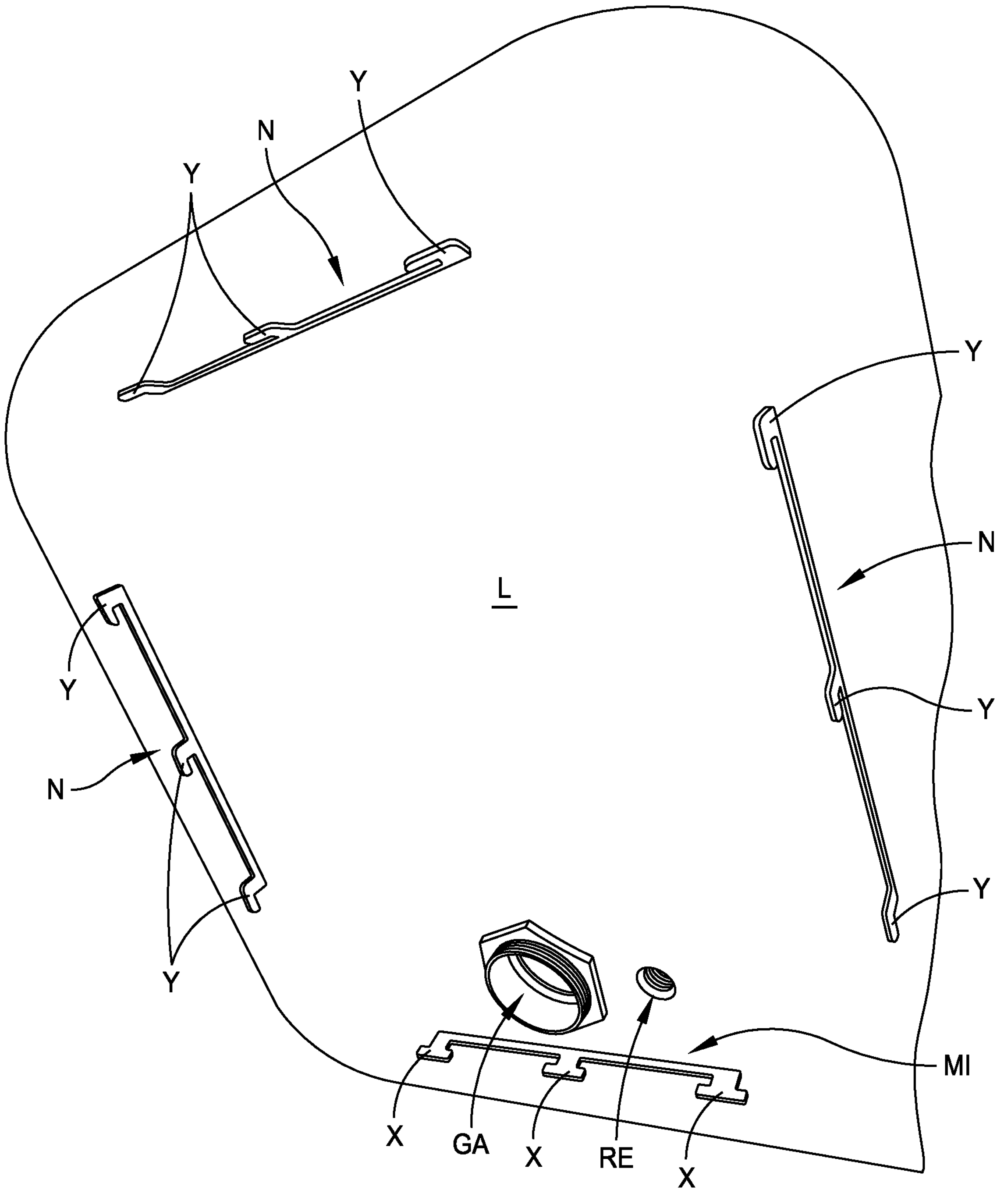
FIG. 7 illustrates the underside of the lid with interlock bars disposed in a predetermined pattern.
Figure 8:
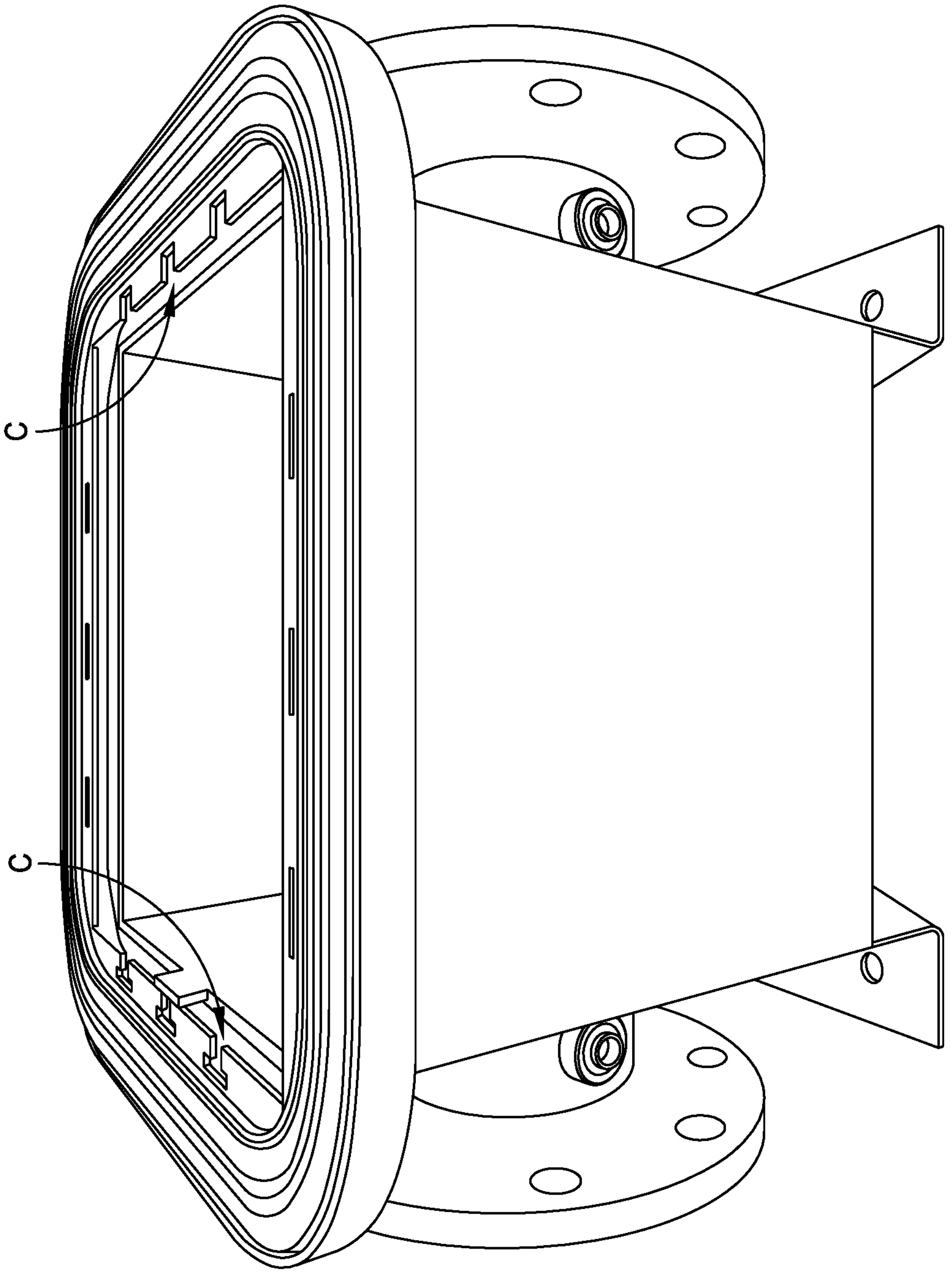
FIG. 8 is a front perspective view of the same strainer housing.
Figure 9:
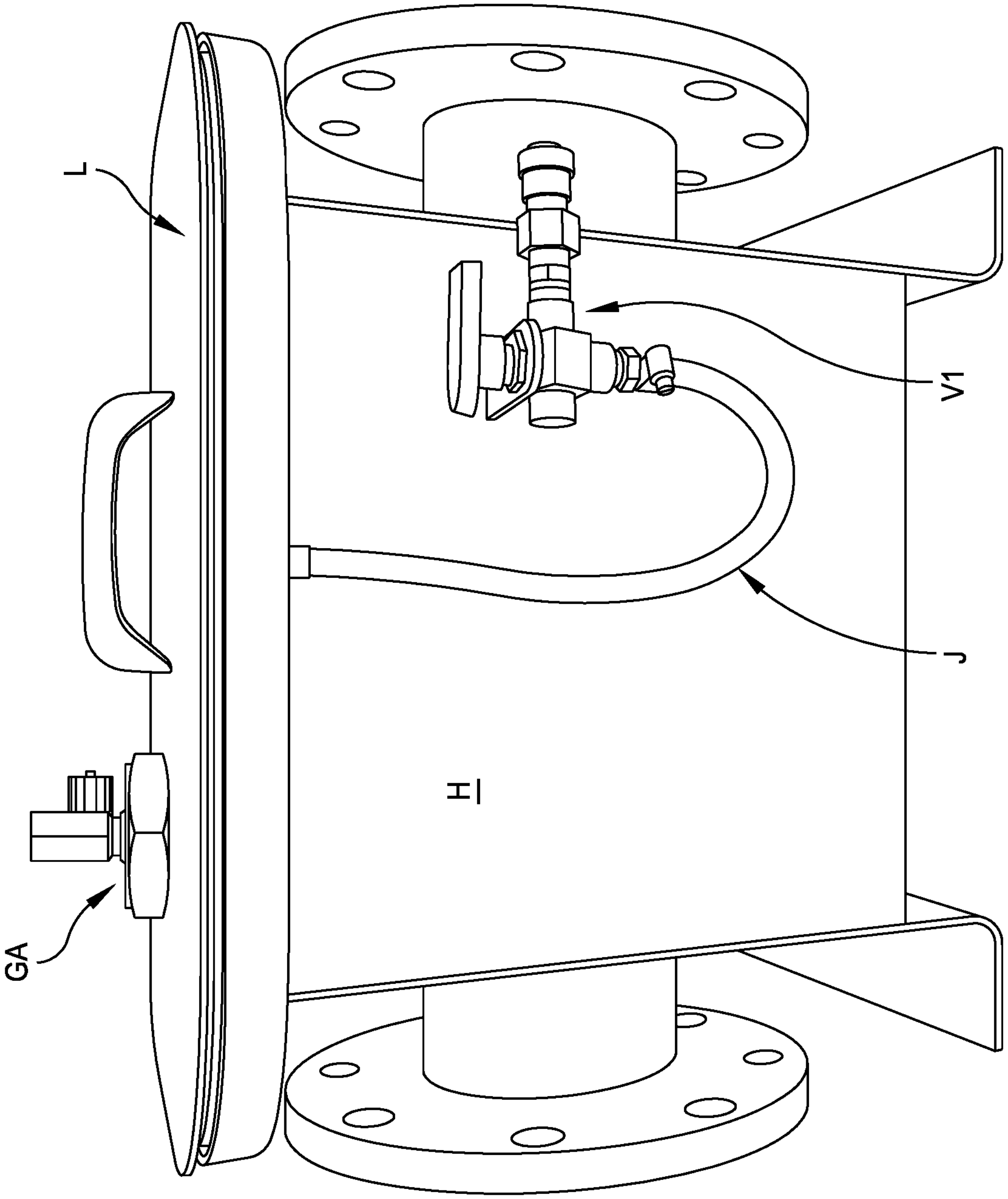
FIG. 9 is a rear view of the strainer housing showing the lid in place.
Figure 10A:
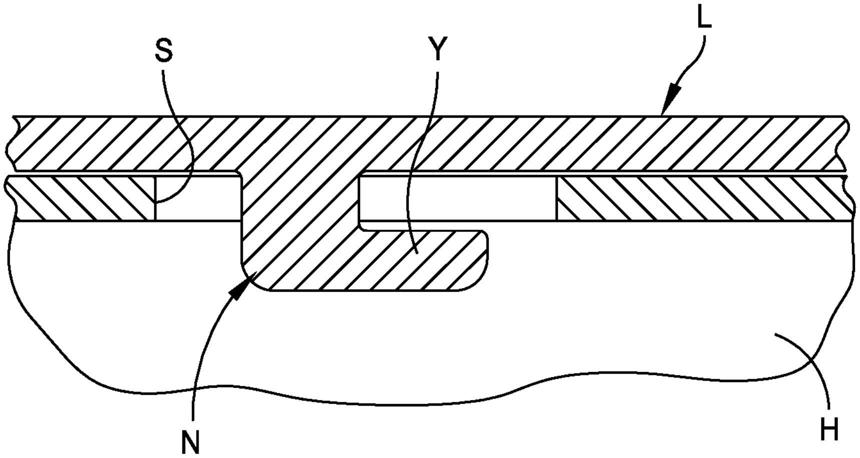
FIG. 10A is a fragmentary view showing the tab end slot about to be engaged.
Figure 10B:
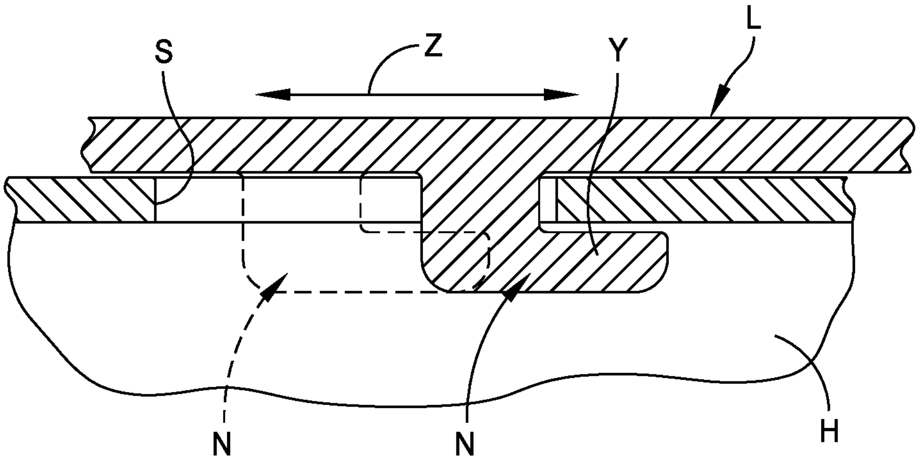
FIG. 10B is a fragmentary view showing the engagement between the tab and slot.

FIG. 6 is a top perspective view of the top of the strainer housing with the basket in place. FIG. 7 illustrates the underside of the lid with interlock bars disposed in a predetermined pattern. FIG. 8 is a front perspective view of the same strainer housing. FIG. 9 is a rear view of the strainer housing showing the lid in place. FIG. 10A is a fragmentary view showing the tab end slot about to be engaged. FIG. 10B is a fragmentary view showing the engagement between the tab and slot so as to provide a positive interlock.

FIGS. 6-9 show various views of the housing H and the lid L. Between those two members, a tab and slot arrangement is used to provide an interlock of the lid to the top of the housing. Refer in particular to FIG. 9 that shows the lid L assembled on the housing H. Regarding the interlocking of the lid with the housing, the underside of the lid has four tab bars N. Refer in particular to FIG. 7 which shows the underside of the lid L. Each of these tab bars has three spaced apart tabs. One of the tab bars identified as bar M1 is provided with T-shaped tabs X. The other three tab bars N each have L-shaped tabs Y.

Reference may now be made to FIG. 6 which shows the slots in the housing. There are provided a series of slots S that are substantially rectangular in shape. At one end of the housing there is provided three T-shaped slots X1. The tabs W illustrated in FIG. 7 are meant to engage with the slots S shown in FIG. 6. At the same time, the tab bar W1 with the T-shaped tabs X are meant for engagement in the slots X1 shown in FIG. 6. The interlocking is provided by moving the lid relative to the housing in the direction of arrow Z in FIG. 6 in order to complete the interlock. FIG. 7 also shows the connection at GA for pneumatic coupling. Also in FIG. 7 RE is directed at a relieve port.

Reference is also made in FIG. 6 to the inclusion of the basket B within the housing. FIG. 6 illustrates the end wall E of the basket B that may be symmetrically aligned with the output port of the housing. In an alternate embodiment of the present invention the end wall E may be slightly off center of the output port of the housing. There are preferably provided perforations P on the top wall of the basket as well as on the end wall. The tapered walls Q may be provided with perforations or may be solid.

Regarding the pneumatic operation, reference may be made to the rear view depicted in FIG. 9. This shows a valve V1. This is the location where the pneumatic pressure is applied. FIG. 9 also shows a hose J that connects the valve V1 into the housing H. This connection couples to the channel C. In this regard refer also to FIGS. 6 and 8 that show the location of an inner channel C where the pneumatic pressure is exerted.

Finally, fragmentary perspective views are illustrated in FIGS. 10A and 10B. FIG. 10A illustrates an initial position of the lid and housing where the tab end slot is about to be engaged. On the other hand, in FIG. 10B the tab is illustrated as engaged with the slot in order to interlock the lid and housing.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A fluid strainer for removing debris from a fluid stream, comprising:

a housing defining an interior chamber, and having an open top with a plurality of slots extending into the housing around the open top, an inlet port and an outlet port that is opposite to the inlet port;

a removable strainer basket sized and shaped such that it may be disposed within the interior chamber by passage through the open top, said removable strainer basket having an open input end into which fluid flows from the inlet port, and opposed tapered sidewalls that extend generally in a flow direction of the fluid from the open input end to an output end closest to the outlet port; and a lid sized to sealingly close the open top, a bottom side of the lid having a plurality of tabs sized and positioned to be inserted into the plurality of slots, to sealingly attach the lid to the housing, closing the open top.

2. The fluid strainer of claim 1, wherein the removable strainer basket further includes an end wall.

3. The fluid strainer of claim 2, wherein the end wall has a series of through holes for the passage of fluid flow.

4. The fluid strainer of claim 3, wherein the opposed tapered sidewalls each include a series of holes.

5. The fluid strainer of claim 3, wherein the end wall is smaller in size than the outlet port in the housing.

6. The fluid strainer of claim 3, wherein the end wall is the same size as the outlet port in the housing.

7. The fluid strainer of claim 3, wherein the end wall is greater in size than the outlet port in the housing.

8. The fluid strainer of claim 3, wherein the inlet port is axially aligned with the outlet port.

9. The fluid strainer of claim 3, wherein the opposed tapered sidewalls are solid and re-direct the fluid flow toward the end wall of the removable strainer basket.

10. The fluid strainer of claim 1, wherein the opposed tapered sidewalls define a decreasing removable strainer basket cross-section, from wider at the inlet port, to narrower at the outlet port.

11. The fluid strainer of claim 1, further comprising a gasket disposed between the housing and the lid.

12. The fluid strainer of claim 11, further including a pneumatic apparatus coupled to the interior chamber to provide a firm seal at the gasket.

13. The fluid strainer of claim 1, further including a catcher capable of intercepting objects above a predetermined size.

14. The fluid strainer of claim 13, wherein the catcher is of cross-shape and is disposed at the open input end of the removable strainer basket.

15. The fluid strainer of claim 1, further including a handle attached to the removable strainer basket.

16. The fluid strainer of claim 1, wherein at least one of the tabs is L-shaped.

17. The fluid strainer of claim 1, wherein at least one of the tabs is T-shaped.

18. The fluid strainer of claim 1, wherein housing is rectangular in shape.

19. The fluid strainer of claim 1, wherein the open top and the lid are rectangular in shape.

20. The fluid strainer of claim 1, further comprising a connection for pneumatic coupling and/or a relieve port.

* * * * *